US009464774B1

(12) United States Patent
Kim

(10) Patent No.: US 9,464,774 B1
(45) Date of Patent: Oct. 11, 2016

(54) VEHICLES LAMP

(71) Applicant: CRESLITE.Inc, Bucheon, Kyunggi-do (KR)

(72) Inventor: Dong Sun Kim, Goyang-si (KR)

(73) Assignee: CRESLITE.INC., Ojeong-Dong, Ojeong-Gu, Bucheon (KR)

( * ) Notice: Subject to any disclaimer, the term of this patent is extended or adjusted under 35 U.S.C. 154(b) by 26 days.

(21) Appl. No.: 14/717,215

(22) Filed: May 20, 2015

(51) Int. Cl.
*B60Q 1/04* (2006.01)
*F21S 8/10* (2006.01)

(52) U.S. Cl.
CPC ......... *F21S 48/1109* (2013.01); *F21S 48/1154* (2013.01); *F21S 48/1208* (2013.01); *F21S 48/1233* (2013.01); *F21S 48/1305* (2013.01); *F21S 48/1364* (2013.01); *F21S 48/321* (2013.01); *F21S 48/328* (2013.01)

(58) Field of Classification Search
CPC ............... F21S 48/1109; F21S 48/328; F21S 48/1305; F21S 48/1233; F21S 48/1364; F21S 48/1154; F21S 48/1208; B60Q 1/04
See application file for complete search history.

(56) References Cited

U.S. PATENT DOCUMENTS

| | | | | | |
|---|---|---|---|---|---|
| 5,626,413 | A * | 5/1997 | Ferrell | .............. | B29C 45/14467 264/1.9 |
| 8,851,723 | B2 * | 10/2014 | Peck | .................... | F21S 48/1159 362/294 |
| 9,400,090 | B2 * | 7/2016 | Arita | ................... | F21S 48/1323 |
| 2012/0201043 | A1 * | 8/2012 | DiPenti | ................ | F21S 48/1104 362/545 |
| 2015/0036369 | A1 * | 2/2015 | Kim | ..................... | F21S 48/1109 362/487 |

* cited by examiner

*Primary Examiner* — Peggy Neils
(74) *Attorney, Agent, or Firm* — John K. Park; Park Law Firm

(57) ABSTRACT

The vehicular lamp comprises: an outer housing made of a heat dissipating material, opened at a front thereof, and having a circuit board received therein, the outer housing including a plurality of heat-dissipating fins formed on an outer surface thereof and including an engaging groove depressed rearwardly along an opened front edge thereof; a reflective housing including a reflective surface formed on a front side thereof and having a rearwardly recessed shape, with the reflective housing received in the opened front portion of the outer housing; an LED fixing member inserted into an inner lower portion of the outer housing through the reflective housing, and having an upwardly bently extending part and including an LED light module mounted at a rear surface thereof so as to be electrically connected to the circuit board; and a transparent cover including an engaging protrusion rearwardly protrudingly formed at a rear edge.

7 Claims, 6 Drawing Sheets

VEHICLES LAMP

CROSS-REFERENCE TO RELATED APPLICATIONS

This application claims the benefit of Korean Patent Application No. 10-2013-0044467, filed on 2015 Mar. 30 in the Korean Intellectual Property Office, which is incorporated herein by reference in its entirety.

BACKGROUND OF THE INVENTION

1. Field of the Invention

The present invention relates to a vehicular lamp, and more particularly, to a vehicular lamp which is developed to facilitate the assembly of respective constituent parts of a lamp that illustrates indirectly by a reflective housing using an LED and have a structure which is easily molded.

2. Description of Related Art

A vehicular lamp is designed such that it is provided at a front of a vehicle to easily secure a drives' front field of view at night. At an early stage in which automobiles were developed, because the speed of the vehicle is very slow, an ordinary lamp employing a carbon filament was used despite low luminance thereof.

Since then, along with development of automobiles, the speed of the vehicle is gradually fast and thus headlights having a higher luminance are required. Recently, halogen lamps are developed and used as vehicular headlights.

In recent years, the halogen lamp is frequently replaced with an LED lamp that can irradiate light having a higher brightness, and have a low power consumption and a long lifespan. In case of new vehicles, a lamp module is often developed into an LED module which is in turn mounted on the vehicles.

However, in case of the LED lamp having a high luminance, although light from the LED lamp is diffused to the front by a front transparent cover, an encountering driver is dazzled by a light point emitted in a small size and a controversial issue associated with bright light is caused.

For this reason, in case of a vehicular lamp having a structure in which light from an LED is irradiated rearwardly and a reflective housing again reflects the irradiated light forwardly, the dazzling caused by a bright light point is reduced and a range in which the reflected light is irradiated can be set to a narrow region. Thus, the vehicular lamp can be contemplated as a solution to the aforementioned problem.

Nevertheless, because a position where the LED is fixed is disposed in a space between the reflective housing and the transparent cover, the structure of the vehicular lamp is complicated and the wiring work according to the complicated structure is performed by only manpower. In addition, there is a problem in that a shortcircuting of an electric wire connected during the work occurs frequently.

In addition, when complicated constituent parts are molded, the manufacturing cost of a mold is increased and an injection molding apparatus requires expensive equipment, thus leading to an increase in the manufacturing cost. Moreover, considerable manpower and time are spent assembling the respective constituent parts of the vehicular lamp.

PRIOR ART LITERATURE

Patent Documents

Patent document 1: Korean Patent Registration No. 10-1262546-0000 (May 2, 2013)

Patent document 2: Korean Patent Registration No. 10-1262610-0000 (May 2, 2013)

Patent document 3: Korean Patent Registration No. 10-1297048-0000 (Aug. 9, 2013)

Patent document 4: U.S. patent Ser. No. 08/408,764 (Apr. 2, 2013)

SUMMARY OF THE INVENTION

Accordingly, the present invention has been made in order to solve the above-described problems occurring in the prior art, and it is an object of the present invention to provide a vehicular lamp in which an outer housing, a reflective housing, an LED fixing member, and a transparent cover that constitute the lamp are simplified in structure so that a manufacture of a mold and a molding operation can be easily performed while the assembly of the respective constituent elements and the wiring work can be easily carried out.

Another object of the present invention is to provide a vehicular lamp which can effectively prevent an assembled transparent cover from being pushed forcibly outwardly by the thermal expansion of silicon.

To accomplish the above object, in accordance with the present invention, there is provided a vehicular lamp including: an outer housing made of a heat dissipating material, opened at a front thereof, and having a circuit board received therein, the outer housing including a plurality of heat-dissipating fins formed on an outer surface thereof and including an engaging groove depressed rearwardly along an opened front edge thereof; a reflective housing including a reflective surface formed on a front side thereof and having a rearwardly recessed shape, with the reflective housing received in the opened front portion of the outer housing; an LED fixing member inserted into an inner lower portion of the outer housing through the reflective housing, and having an upwardly bently extending part and including an LED light module mounted at a rear surface thereof so as to be electrically connected to the circuit board; and a transparent cover including an engaging protrusion rearwardly protrudingly formed at a rear edge thereof so as to be insertingly engaged into the engaging groove of the outer housing, wherein the outer housing includes a seating groove formed on the inner bottom surface thereof so as to extend depressed from a front end thereof to a rear end thereof, and a guide groove depressively formed on each of both inner wall surfaces thereof so as to extend rearwardly, wherein the LED fixing member includes an insertion block having a rectangular parallelepiped shape formed at a lower end thereof so as to be seated on the seating groove, and a guide protrusion formed on each of both sides of the insertion block so as to be inserted into the guide groove, and wherein the reflective housing includes an incised groove formed on the bottom surface thereof so as to extend from a front end thereof to a rear end thereof to allow the upwardly bently extending part and the insertion block of the LED fixing member to pass therethrough, and a skirt formed upwardly convexly at a rear portion of the incised groove in a shape which surrounds the top of the insertion block of the LED fixing member.

In addition, the outer housing may include an insertion groove formed at a front end of the seating groove of the outer housing so as to be stepped in a left and right width direction thereof and depressed downwardly, and the LED fixing member may include a seating block formed at a rear side of the insertion block so as to be seated on the insertion groove.

Further, the seating block may includes a guide rib formed at front upper portion thereof so as to extend rearwardly and a fixing groove depressively formed at the center of a top surface of the guide rib so as to be extend rearwardly transversely, and wherein the transparent cover may include a fixing protrusion formed at a rear side thereof so as to be inserted into the fixing groove of the seating block.

Moreover, the circuit board may be inserted at a lower end thereof into a distal end of the rear of the engaging groove and may include a first ground part formed at a lower front end thereof, and the insertion block may includes a connection plate mounted on the rear surface thereof and including a second ground plate coupled to the first ground part.

In addition, the insertion block may include a first wire receiving groove formed on an underside thereof so as to extend from the rear to the front thereof and penetrate through the top thereof, and the upwardly bently extending part of the LED fixing member may include a pair of protruding ribs formed rearwardly protrudingly from the rear surface thereof so as to be arranged in parallel with each other to have a second wire receiving groove defined therebetween.

Further, the transparent cover may includes a fixing clip formed at each of both center portions thereof so as to extend rearwardly, bent downwardly, and again extend bent forwardly, and the outer housing may includes a fixing protrusion formed at each of both center portions thereof in a shape which is depressed at the peripheral portion and protruded at the central portion so as to allow the fixing clip to be seated thereon.

In addition, the reflective housing may include a pair of fixing pieces formed at each of the upper and lower front ends thereof so as to extend rearwardly and then bent upwardly and downwardly, respectively, and the outer housing may includes a pair of insertion grooves formed at each of the upper and lower inner ends thereof to allow the fixing pieces to be insertingly seated therein.

As described above, the present invention has advantageous effects in that the outer housing, the reflective housing, the LED fixing member, and the transparent cover that constitute the lamp are configured in a shape which can be easily molded to reduce a mold manufacturing cost, and in that the assembly of the respective constituent elements and the wiring work can be easily carried out to improve productivity.

In addition, the assembled transparent cover can be prevented from being pushed forcibly outwardly by the thermal expansion of silicon so that rigidity and durability can be secured

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

Figure 1:
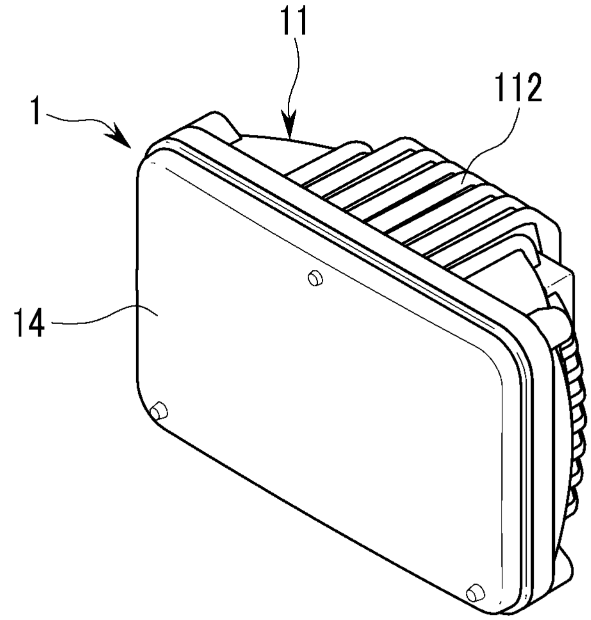
FIG. 1 is a perspective view illustrating a vehicular lamp according to an embodiment of the present invention.

11: outer housing
111: circuit board
112: heat-dissipating fins
113: engaging groove
114: seating groove
115: guide groove
116: insertion groove
117: first ground part
118: fixing protrusion
119: insertion groove
12: reflective housing
121: incised groove
122: skirt
123: fixing piece
13: LED fixing member
131: LED light module
132: insertion block
132*a*: first wire receiving groove
133: guide protrusion
134: seating block
135: guide rib
136: fixing groove
137: connection plate
137*a*: second ground part
138: protruding rib
138*a*: second wire receiving groove
139: electric wire
14: transparent cover
141: engaging protrusion
142: fixing protrusion
143: fixing clip

DETAILED DESCRIPTION OF THE PREFERRED EMBODIMENTS

Now, preferred embodiments of the present invention will be described in detail with reference to the accompanying drawings. In the following description, the detailed description on relevant known functions and constructions unnecessarily obscuring the subject matter of the present invention will be avoided hereinafter.

Hereinafter, the configuration of the present invention will be described in detail with reference to the accompanying drawings so as to allow those skilled in the art to easily understand and carry out the present invention.

Figure 2:
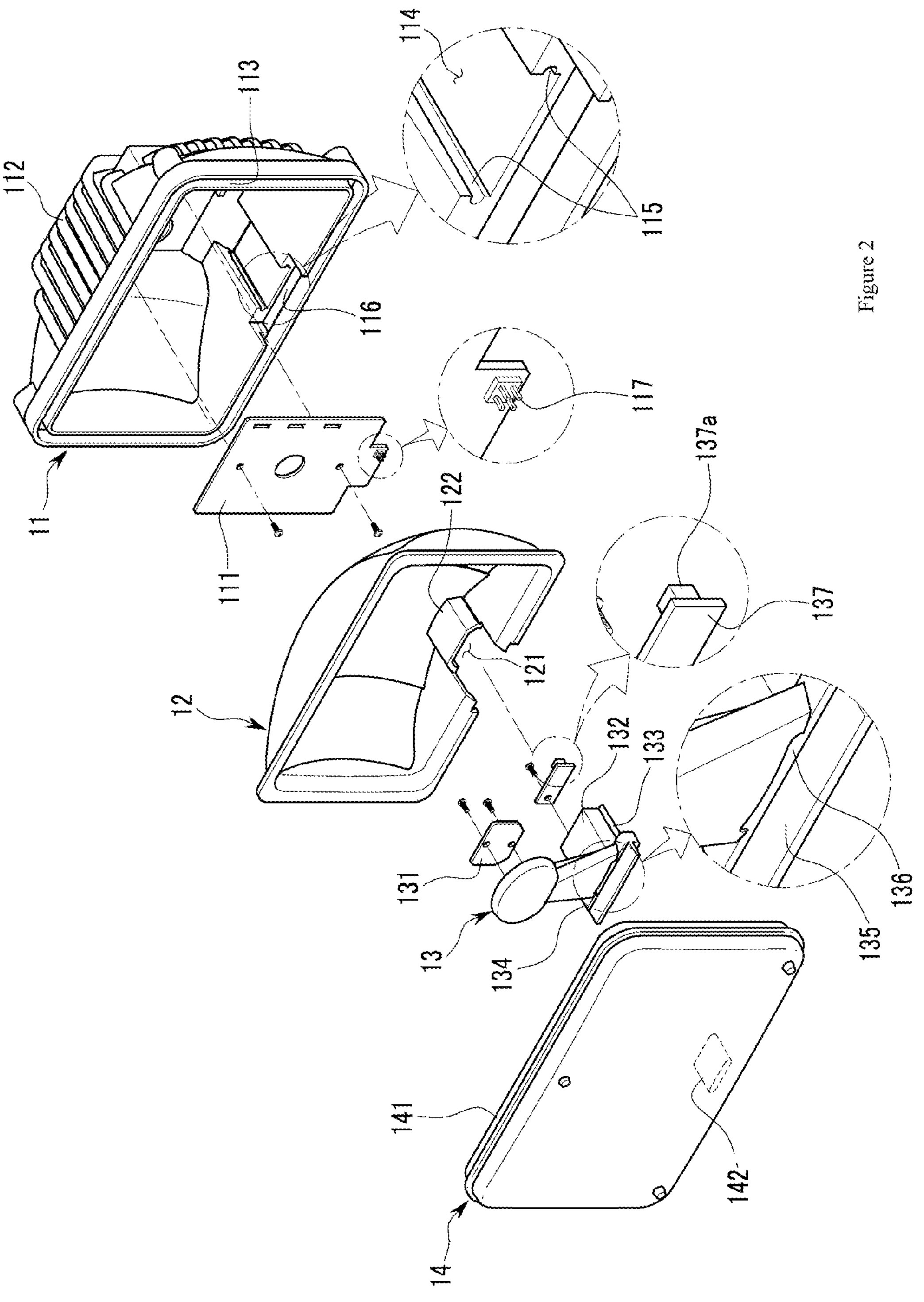
FIG. 2 is a front exploded perspective view illustrating a vehicular lamp according to an embodiment of the present invention.
Figure 3:
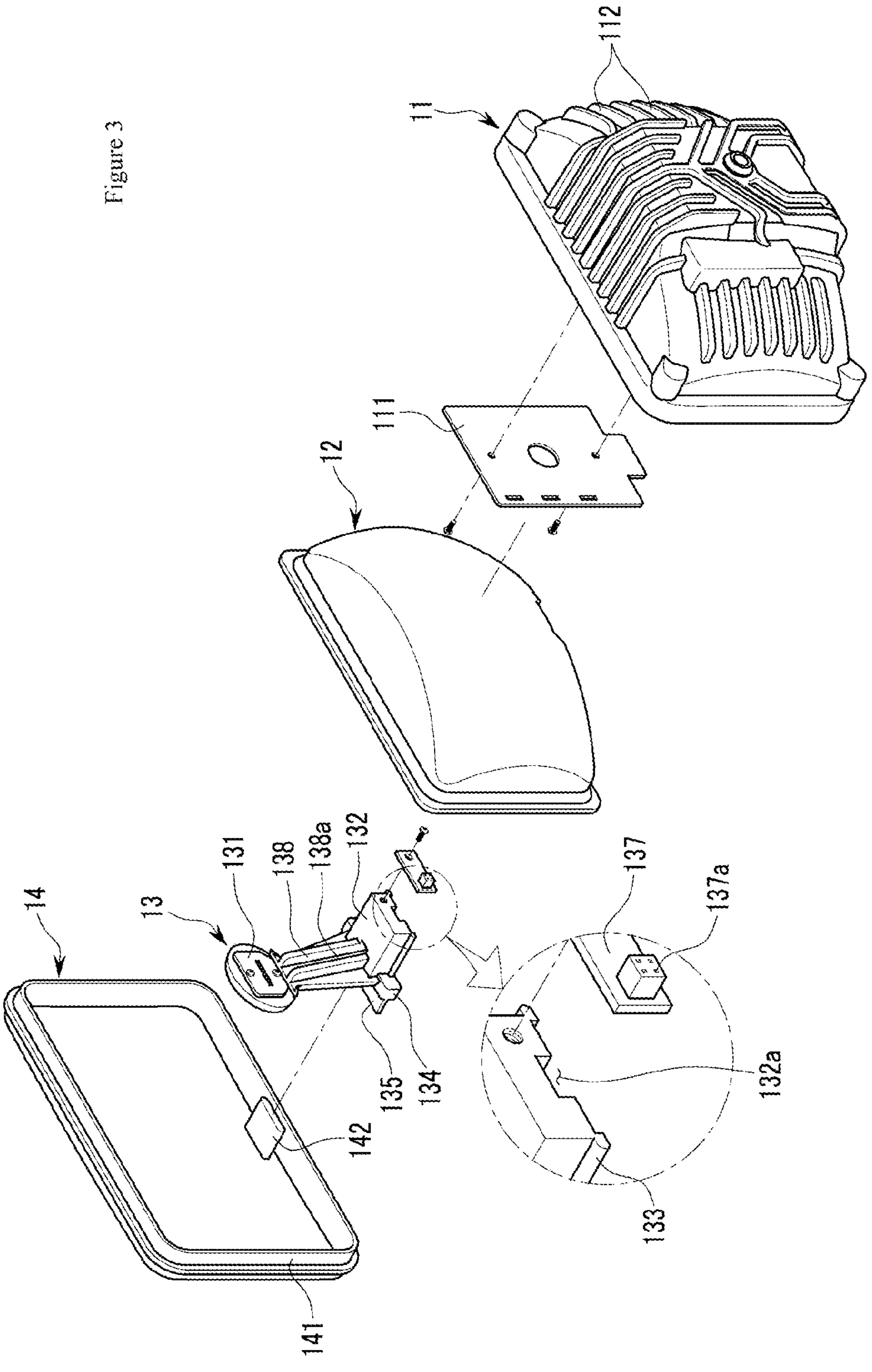
FIG. 3 is a rear exploded perspective view illustrating a vehicular lamp according to an embodiment of the present invention.
Figure 4:
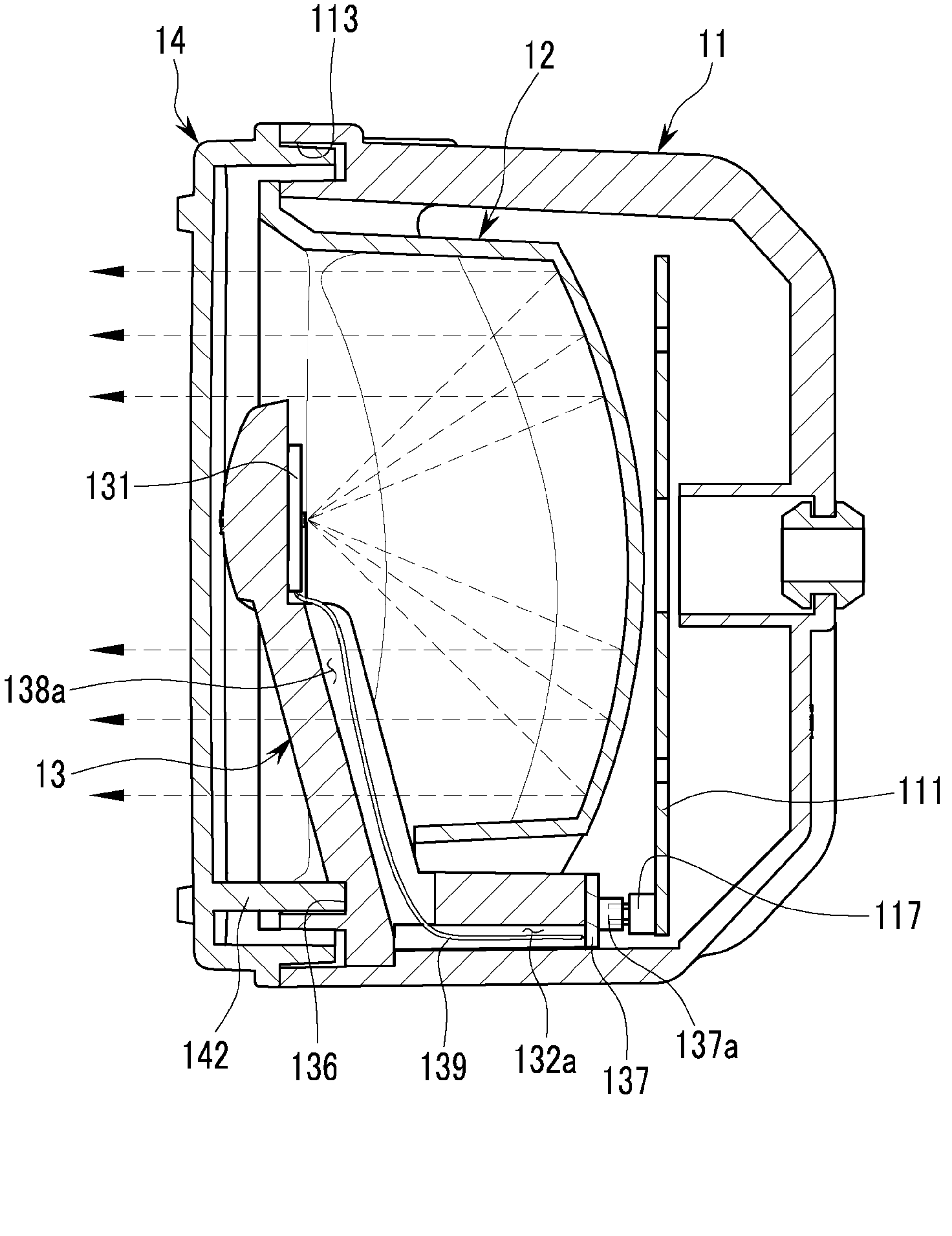
FIG. 4 is a side cross-sectional view illustrating a vehicular lamp according to an embodiment of the present invention.

FIG. 1 is a perspective view illustrating a vehicular lamp according to an embodiment of the present invention, FIG. 2 is a front exploded perspective view illustrating a vehicular lamp according to an embodiment of the present invention, FIG. 3 is a rear exploded perspective view illustrating a vehicular lamp according to an embodiment of the present invention, and FIG. 4 is a side cross-sectional view illustrating a vehicular lamp according to an embodiment of the present invention.

The vehicular lamp according to an embodiment of the present invention includes: an outer housing 11 made of a heat dissipating material, opened at a front thereof, and having a circuit board 111 received therein, the outer housing including a plurality of heat-dissipating fins 112 formed on an outer surface thereof and including an engaging groove 113 depressed rearwardly along an opened front edge thereof; a reflective housing 12 including a reflective surface formed on a front side thereof and having a rearwardly recessed shape, with the reflective housing received in the opened front portion of the outer housing 11; an LED fixing member inserted into an inner lower portion of the outer housing through the reflective housing 12, and having an upwardly bently extending part and including an LED light module 13 mounted at a rear surface thereof so as to be electrically connected to the circuit board 111; and a transparent cover 14 including an engaging protrusion 141 rearwardly protrudingly formed at a rear edge thereof so as to be insertingly engaged into the engaging groove 113 of the outer housing 11.

The outer housing 11 includes a seating groove 114 formed on the inner bottom surface thereof so as to extend depressed from a front end thereof to a rear end thereof, and a guide groove 115 depressively formed on each of both inner wall surfaces thereof so as to extend rearwardly.

The LED fixing member 13 includes an insertion block 132 having a rectangular parallelepiped shape formed at a lower end thereof so as to be seated on the seating groove 114, and a guide protrusion 133 formed on each of both sides of the insertion block 132 so as to be inserted into the guide groove 115.

The reflective housing 12 includes an incised groove 121 formed on the bottom surface thereof so as to extend from a front end thereof to a rear end thereof to allow the upwardly bently extending part and the insertion block 132 of the LED fixing member 13 to pass therethrough, and a skirt 122 formed upwardly convexly at a rear portion of the incised groove 121 in a shape which surrounds the top of the insertion block 132 of the LED fixing member.

The vehicular lamp of the present invention features in that it is implemented without any assembly by separate screws by improving the structures of the outer housing 11, the reflective housing 12, the LED fixing member 13, and the transparent cover 14, which are constituent elements of the present invention. In particular, the reflective housing 12 and the LED fixing member 13 are insertingly received into the outer housing 11 along the seating groove 114 and the guide groove 115 of the outer housing 11 and then the transparent cover 14 is assembled to the reflective housing 12 and the outer housing 11 so that the outer housing 11, the reflective housing 12, the LED fixing member 13, and the transparent cover 14 are prevented from escaping from each other. When silicon is injected into the engaging groove 113 of the outer housing 11 and then the transparent cover 14 is assembled to the outer housing 11, a structure is obtained in which the silicon becomes hard and then is securely fixed.

Particularly, the shapes of the outer housing 11, the reflective housing 12, and the transparent cover 14 can be manufactured using a simple mold consisting of an upper mold and a lower mold, but not a complicated core mold, thereby effectively reducing the manufacturing cost.

In addition, the assembly process is easy, and thus productivity can be improved.

In a more preferred embodiment of the present invention, the outer housing 11 includes an insertion groove 116 formed at a front end of the seating groove 114 of the outer housing 11 so as to be stepped in a left and right width direction thereof and depressed downwardly, and the LED fixing member 13 includes a seating block 134 formed at a rear side of the insertion block 132 so as to be seated on the insertion groove 116.

This embodiment is carried out such that the insertion block 132 of the LED fixing member 13 can be correctly seated on a position where the insertion block 132 of the LED fixing member 13 are inserted in the outer housing 11.

In addition, the seating block 134 includes a guide rib 135 formed at front upper portion thereof so as to extend rearwardly, and a fixing groove 136 depressively formed at the center of a top surface of the guide rib 135 so as to be extend rearwardly transversely. The transparent cover 14 includes a fixing protrusion 142 formed at a rear side thereof so as to be inserted into the fixing groove 136 of the seating block 134.

In this embodiment, the fixing protrusion 142 of the transparent cover 14 can be insertingly coupled to a correct position of the LED fixing member 13 and serves to support the transparent cover. The fixing protrusion 142 also serves to securely fix the LED fixing member 13 at a correct position as shown in FIG. 4.

Besides, in the present invention, the circuit board 111 is inserted at a lower end thereof into a distal end of the rear of the engaging groove 113 and includes a first ground part 117 formed at a lower front end thereof, and the insertion block 132 includes a connection plate 137 mounted on the rear surface thereof and including a second ground plate 137*a* coupled to the first ground part 117.

In this embodiment, a work of connecting an electric wire 139 for supplying power and applying a signal is performed manually. In addition, in a process of assembling the long electric wire 139, a problem is solved in that a force is applied to an electric wire connected portion, thus leading to an escape of the wire, and much assembly time is spent.

In other words, the LED light module 131 and the connection plate 137 of the LED fixing member 13 are electrically connected to each other by the electric wire 139, and then the LED fixing member 13 is pushed rearwardly of the outer housing 11 through the seating groove 114 so that the LED light module 131 is automatically electrically connected to the circuit board 111.

In addition, in the present invention, the insertion block 132 includes a first wire receiving groove 132*a* formed on an underside thereof so as to extend from the rear to the front thereof and penetrate through the top thereof, and the upwardly bently extending part of the LED fixing member 13 includes a pair of protruding ribs 138 formed rearwardly protrudingly from the rear surface thereof so as to be arranged in parallel with each other to have a second wire receiving groove 132*a* defined therebetween. In this embodiment, a passage for passing through the electric wire 139 is configured so that the connection of the wire is performed more easily and the electric wire is prevented from being exposed to the outside of the vehicular lamp.

Figure 5:
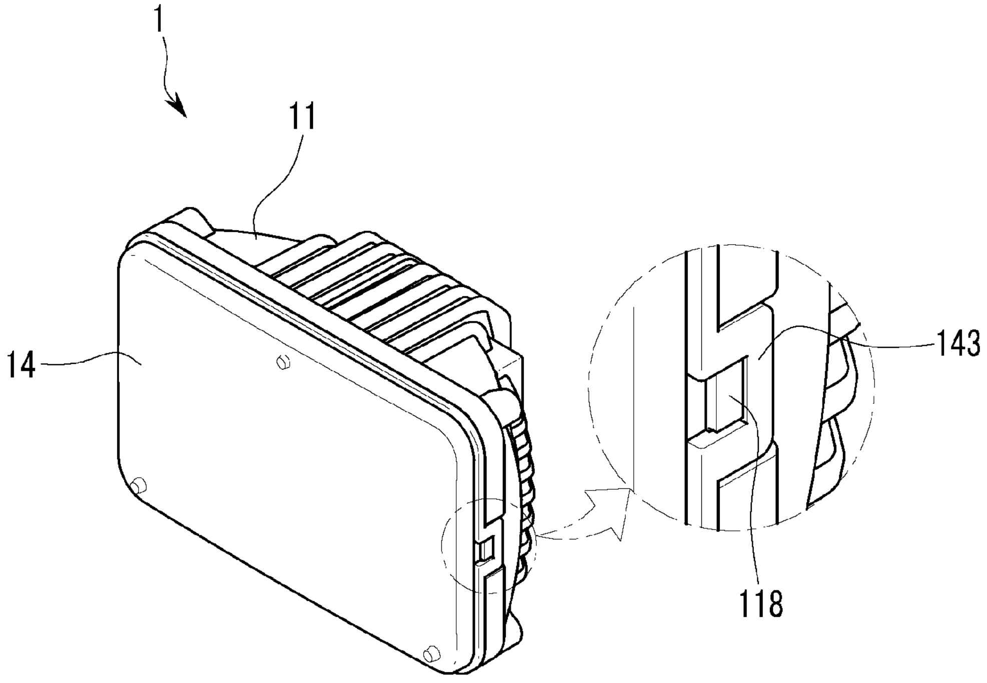
FIG. 5 is a perspective view illustrating a vehicular lamp according to another embodiment of the present invention.
Figure 6:
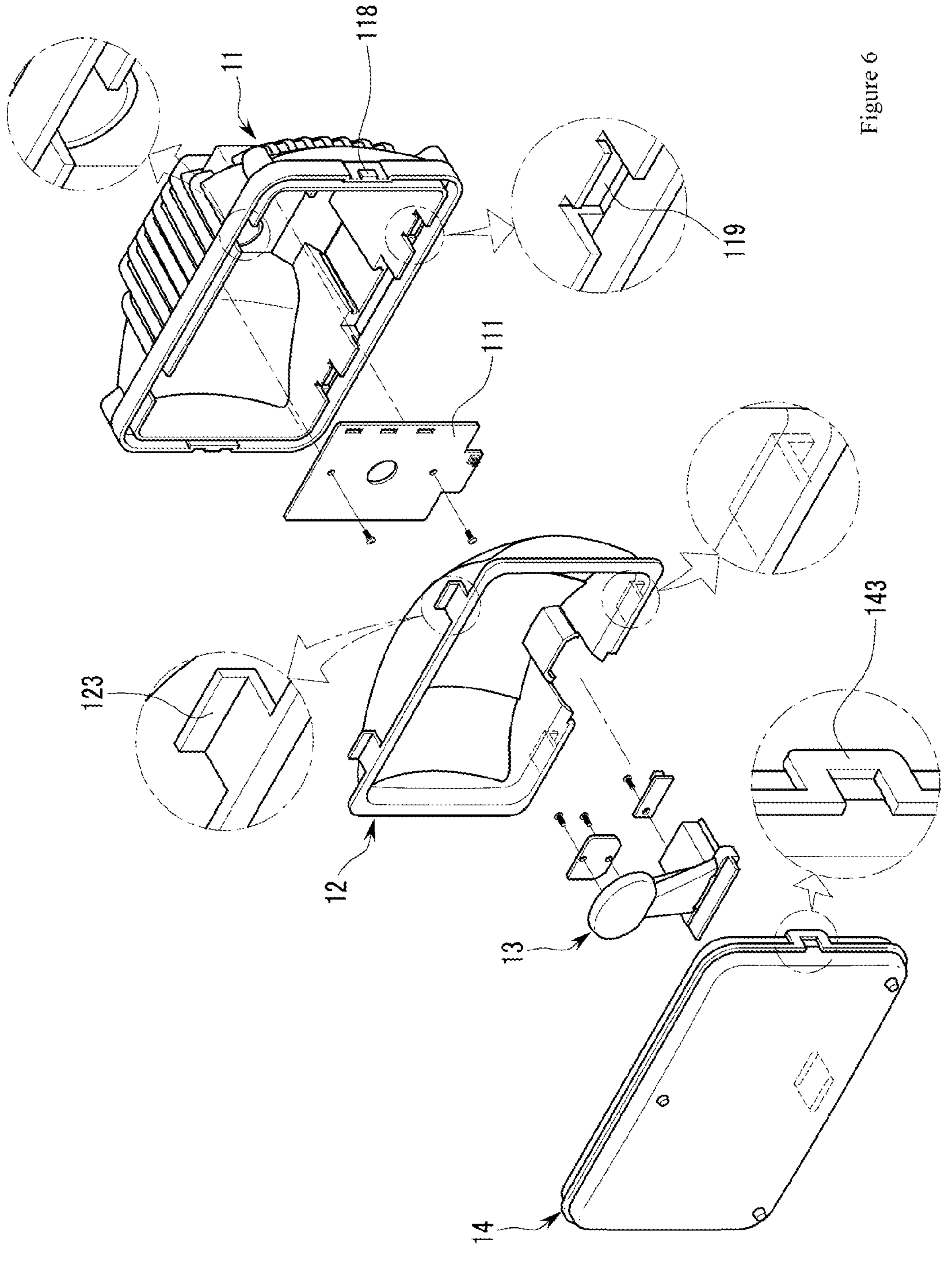
FIG. 6 is a front perspective view illustrating a vehicular lamp according to another embodiment of the present invention.

FIG. 5 is a perspective view illustrating a vehicular lamp according to another embodiment of the present invention, and FIG. 6 is a front perspective view illustrating a vehicular lamp according to another embodiment of the present invention.

In FIGS. 5 and 6, the transparent cover 14 includes a fixing clip 143 formed at each of both center portions thereof so as to extend rearwardly, bent downwardly, and again extend bent forwardly, and the outer housing 11 includes a fixing protrusion 118 formed at each of both center portions thereof in a shape which is depressed at the peripheral portion and protruded at the central portion so as to allow the fixing clip 143 to be seated thereon.

In this embodiment, silicon is injected into the engaging groove 113 of the outer housing 11 and then the engaging protrusion 141 of the transparent cover 14 is inserted into the engaging groove 113. When gas is generated in a silicon drying process, it is prevented that the silicon expands to cause the transparent cover 14 to be forcibly pushed forwardly.

In addition, the reflective housing 12 includes a pair of fixing pieces 123 formed at each of the upper and lower front ends thereof so as to extend rearwardly and then bent upwardly and downwardly, respectively, and the outer housing 11 includes a pair of insertion grooves 119 formed at each of the upper and lower inner ends thereof to allow the fixing pieces 123 to be insertingly seated therein.

In this embodiment, the reflective housing 12 can be seated at a correct position in the outer housing 11 and the vehicular lamp can be maintained in a fixed state even against vibration and shock occurring during the driving of a vehicle.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, various embodiments of the present invention are merely for reference in defining the scope of the invention, and the true technical scope of the present invention should be defined by the technical spirit of the appended claims.

What is claimed is:

1. A vehicular lamp comprising: an outer housing made of a heat dissipating material, opened at a front thereof, and having a circuit board received therein, the outer housing including a plurality of heat-dissipating fins formed on an outer surface thereof and including an engaging groove depressed rearwardly along an opened front edge thereof; a reflective housing including a reflective surface formed on a front side thereof and having a rearwardly recessed shape, with the reflective housing received in the opened front portion of the outer housing; an LED fixing member inserted into an inner lower portion of the outer housing through the reflective housing, and having an upwardly bently extending part and including an LED light module mounted at a rear surface thereof so as to be electrically connected to the circuit board; and a transparent cover including an engaging protrusion rearwardly protrudingly formed at a rear edge thereof so as to be insertingly engaged into the engaging groove of the outer housing, wherein the outer housing comprises a seating groove formed on the inner bottom surface thereof so as to extend depressed from a front end thereof to a rear end thereof, and a guide groove depressively formed on each of both inner wall surfaces thereof so as to extend rearwardly, wherein the LED fixing member comprises an insertion block having a rectangular parallelepiped shape formed at a lower end thereof so as to be seated on the seating groove, and a guide protrusion formed on each of both sides of the insertion block so as to be inserted into the guide groove, and wherein the reflective housing comprises an incised groove formed on the bottom surface thereof so as to extend from a front end thereof to a rear end thereof to allow the upwardly bently extending part and the insertion block of the LED fixing member to pass therethrough, and a skirt formed upwardly convexly at a rear portion of the incised groove in a shape which surrounds the top of the insertion block of the LED fixing member.

2. The vehicular lamp according to claim 1, wherein the outer housing comprises an insertion groove formed at a front end of the seating groove of the outer housing so as to be stepped in a left and right width direction thereof and depressed downwardly, and the LED fixing member comprises a seating block formed at a rear side of the insertion block so as to be seated on the insertion groove.

3. The vehicular lamp according to claim 2, wherein the seating block comprises a guide rib formed at front upper portion thereof so as to extend rearwardly and a fixing groove depressively formed at the center of a top surface of the guide rib so as to be extend rearwardly transversely, and wherein the transparent cover comprises a fixing protrusion formed at a rear side thereof so as to be inserted into the fixing groove of the seating block.

4. The vehicular lamp according to claim 1, wherein the circuit board is inserted at a lower end thereof into a distal end of the rear of the engaging groove and comprises a first ground part formed at a lower front end thereof, and wherein the insertion block comprises a connection plate mounted on the rear surface thereof and including a second ground plate coupled to the first ground part.

5. The vehicular lamp according to claim 4, wherein the insertion block comprises a first wire receiving groove formed on an underside thereof so as to extend from the rear to the front thereof and penetrate through the top thereof, and the upwardly bently extending part of the LED fixing member comprises a pair of protruding ribs formed rearwardly protrudingly from the rear surface thereof so as to be arranged in parallel with each other to have a second wire receiving groove defined therebetween.

6. The vehicular lamp according to claim 1, wherein the transparent cover comprises a fixing clip formed at each of both center portions thereof so as to extend rearwardly, bent downwardly, and again extend bent forwardly, and the outer housing comprises a fixing protrusion formed at each of both center portions thereof in a shape which is depressed at the peripheral portion and protruded at the central portion so as to allow the fixing clip to be seated thereon.

7. The vehicular lamp according to claim 1, wherein the reflective housing comprises a pair of fixing pieces formed at each of the upper and lower front ends thereof so as to extend rearwardly and then bent upwardly and downwardly, respectively, and the outer housing comprises a pair of insertion grooves formed at each of the upper and lower inner ends thereof to allow the fixing pieces to be insertingly seated therein.

* * * * *